(12) United States Patent
Tuttle et al.

(10) Patent No.: US 9,408,047 B2
(45) Date of Patent: Aug. 2, 2016

(54) READ ACKNOWLEDGEMENT INTEROPERABILITY FOR TEXT MESSAGING AND IP MESSAGING

(71) Applicant: TeleCommunication Systems, Inc., Annapolis, MD (US)

(72) Inventors: Lewis Tuttle, Queens Town, MD (US); Dennis Meyer, Annapolis, MD (US); Phillip W. Geil, Clarksville, MD (US)

(73) Assignee: Telecommunication Systems, Inc., Annapolis, MD (US)

( * ) Notice: Subject to any disclaimer, the term of this patent is extended or adjusted under 35 U.S.C. 154(b) by 0 days.

(21) Appl. No.: 14/509,335

(22) Filed: Oct. 8, 2014

(65) Prior Publication Data
US 2015/0105110 A1  Apr. 16, 2015

Related U.S. Application Data

(60) Provisional application No. 61/889,231, filed on Oct. 10, 2013.

(51) Int. Cl.
*H04W 4/00* (2009.01)
*H04W 4/12* (2009.01)

(52) U.S. Cl.
CPC .................................. *H04W 4/12* (2013.01)

(58) Field of Classification Search
USPC ............................. 455/412.1, 466; 709/206
See application file for complete search history.

(56) References Cited

U.S. PATENT DOCUMENTS

| | | | |
|---|---|---|---|
| 1,103,073 A | 1/1914 | O'Connel | |
| 3,400,222 A | 9/1968 | Nigtingale | |

(Continued)

FOREIGN PATENT DOCUMENTS

| | | |
|---|---|---|
| FR | PCT/FI99/00935 | 11/1999 |
| GB | 2308528 | 12/1995 |

(Continued)

OTHER PUBLICATIONS

Bond, "Cellular Carriers Use Prepaid Programs to Reach Untapped Markets," Billing World, Mar. 1997, pp. 14-17.

(Continued)

*Primary Examiner* — David Q Nguyen
(74) *Attorney, Agent, or Firm* — Tarolli, Sundheim, Covell & Tummino LLP

(57) ABSTRACT

Use of information-elements (IE) to enable global system for mobile communications (GSM) devices to support read acknowledgements for text messaging, e.g., short message service (SMS). A GSM device inserts a read acknowledgement request Information-Element (IE) into the body of an SMS message to request that a read acknowledgement be returned to the sending device upon opening. When a GSM recipient device opens an SMS message with a read acknowledgement request IE, the GSM recipient device creates a read acknowledgement SMS message by populating a read acknowledgement message indicator IE, inserting the read acknowledgement message IE into an SMS message, and forwarding the read acknowledgement SMS message to an originating GSM device. Read acknowledgement IEs have a message value that allows a mobile device to associate a read acknowledgement with a particular SMS message. A short message service center (SMSC) supports interoperability between GSM, CDMA, IP, MME, and SMPP read acknowledgements.

15 Claims, 8 Drawing Sheets

(56) References Cited

U.S. PATENT DOCUMENTS

| | | | |
|---|---|---|---|
| 3,920,908 | A | 11/1975 | Kraus |
| 4,310,726 | A | 1/1982 | Asmuth |
| 4,399,330 | A | 8/1983 | Kuenzel |
| 4,494,119 | A | 1/1985 | Wimbush |
| 4,651,156 | A | 3/1987 | Martinez |
| 4,680,785 | A | 7/1987 | Akiyana et al. |
| 4,706,275 | A | 11/1987 | Kamil |
| 4,725,719 | A | 2/1988 | Oncken et al. |
| 4,756,020 | A | 7/1988 | Fodale |
| 4,776,000 | A | 10/1988 | Parienti |
| 4,776,003 | A | 10/1988 | Harris |
| 4,776,033 | A | 10/1988 | Scheinert |
| 4,831,647 | A | 5/1989 | D'Avello et al. |
| 4,845,740 | A | 7/1989 | Tokuyama et al. |
| 4,852,149 | A | 7/1989 | Zwick |
| 4,852,155 | A | 7/1989 | Barraud |
| 4,860,341 | A | 8/1989 | D'Avello et al. |
| 4,891,638 | A | 1/1990 | Davis |
| 4,891,650 | A | 1/1990 | Sheffer |
| 4,901,340 | A | 2/1990 | Parker et al. |
| 4,935,956 | A | 6/1990 | Hellworth et al. |
| 4,951,308 | A | 8/1990 | Bishop et al. |
| 4,952,928 | A | 8/1990 | Carroll |
| 5,003,585 | A | 3/1991 | Richer |
| 5,014,206 | A | 5/1991 | Scribner |
| 5,043,736 | A | 8/1991 | Darnell et al. |
| 5,046,088 | A | 9/1991 | Margulies |
| 5,055,851 | A | 10/1991 | Sheffer et al. |
| 5,063,588 | A | 11/1991 | Patsiokas et al. |
| 5,068,656 | A | 11/1991 | Sutherland |
| 5,068,891 | A | 11/1991 | Marshall |
| 5,070,329 | A | 12/1991 | Jasinaki |
| 5,081,667 | A | 1/1992 | Drori |
| 5,103,449 | A | 4/1992 | Jolissant |
| 5,119,104 | A | 6/1992 | Heller |
| 5,127,040 | A | 6/1992 | D'Avello et al. |
| 5,128,938 | A | 7/1992 | Borras |
| 5,138,648 | A | 8/1992 | Palomeque et al. |
| 5,138,650 | A | 8/1992 | Stahl et al. |
| 5,144,283 | A | 9/1992 | Arens et al. |
| 5,144,649 | A | 9/1992 | Zicker et al. |
| 5,159,625 | A | 10/1992 | Zicker |
| 5,161,180 | A | 11/1992 | Chavous |
| 5,177,478 | A | 1/1993 | Wagai et al. |
| 5,187,710 | A | 2/1993 | Chou et al. |
| 5,193,215 | A | 3/1993 | Olmer |
| 5,208,756 | A | 5/1993 | Song |
| 5,214,789 | A | 5/1993 | George |
| 5,216,703 | A | 6/1993 | Roy |
| 5,218,367 | A | 6/1993 | Sheffer et al. |
| 5,220,593 | A | 6/1993 | Zicker |
| 5,223,844 | A | 6/1993 | Mansell |
| 5,233,642 | A | 8/1993 | Renton |
| 5,235,630 | A | 8/1993 | Moodey |
| 5,239,570 | A | 8/1993 | Koster |
| 5,265,155 | A | 11/1993 | Castro |
| 5,266,944 | A | 11/1993 | Carroll et al. |
| 5,274,802 | A | 12/1993 | Altine |
| 5,276,444 | A | 1/1994 | McNair |
| 5,289,527 | A | 2/1994 | Tiedemann |
| 5,291,543 | A | 3/1994 | Freese et al. |
| 5,293,642 | A | 3/1994 | Lo |
| 5,297,189 | A | 3/1994 | Chabernaud |
| 5,299,132 | A | 3/1994 | Wortham |
| 5,301,223 | A | 4/1994 | Amadon et al. |
| 5,301,234 | A | 4/1994 | Mazziotto et al. |
| 5,309,501 | A | 5/1994 | Kozik et al. |
| 5,311,572 | A | 5/1994 | Frieder et al. |
| 5,321,735 | A | 6/1994 | Breeden |
| 5,325,302 | A | 6/1994 | Izidon |
| 5,325,418 | A | 6/1994 | McGregor et al. |
| 5,327,144 | A | 7/1994 | Stilp et al. |
| 5,329,578 | A | 7/1994 | Brennan et al. |
| 5,334,974 | A | 8/1994 | Simms |
| 5,339,352 | A | 8/1994 | Armstrong et al. |
| 5,341,414 | A | 8/1994 | Popke |
| 5,343,493 | A | 8/1994 | Kaimullah |
| 5,347,568 | A | 9/1994 | Moody |
| 5,351,235 | A | 9/1994 | Lahtinen |
| 5,353,335 | A | 10/1994 | D'Urso |
| 5,359,182 | A | 10/1994 | Schilling |
| 5,359,642 | A | 10/1994 | Castro |
| 5,359,643 | A | 10/1994 | Gammino |
| 5,361,212 | A | 11/1994 | Class |
| 5,363,425 | A | 11/1994 | Mufti |
| 5,369,699 | A | 11/1994 | Page et al. |
| 5,374,936 | A | 12/1994 | Feng |
| 5,379,451 | A | 1/1995 | Nakagoshi |
| 5,381,338 | A | 1/1995 | Wysocki |
| 5,384,825 | A | 1/1995 | Dillard et al. |
| 5,387,993 | A | 2/1995 | Heller |
| 5,388,147 | A | 2/1995 | Grimes |
| 5,390,339 | A | 2/1995 | Bruckert |
| 5,394,158 | A | 2/1995 | Chia |
| 5,396,227 | A | 3/1995 | Carroll |
| 5,396,545 | A | 3/1995 | Nair et al. |
| 5,396,558 | A | 3/1995 | Ishiquoro et al. |
| 5,398,190 | A | 3/1995 | Wortham |
| 5,404,580 | A | 4/1995 | Simpson et al. |
| 5,406,614 | A | 4/1995 | Hara |
| 5,408,513 | A | 4/1995 | Busch et al. |
| 5,408,519 | A | 4/1995 | Pierce et al. |
| 5,408,682 | A | 4/1995 | Ranner et al. |
| 5,412,726 | A | 5/1995 | Nevoux et al. |
| 5,418,537 | A | 5/1995 | Bird |
| 5,423,076 | A | 6/1995 | Westergren |
| 5,430,759 | A | 7/1995 | Yokev et al. |
| 5,432,841 | A | 7/1995 | Rimer |
| 5,434,789 | A | 7/1995 | Fraker |
| 5,438,615 | A | 8/1995 | Moen |
| 5,440,621 | A | 8/1995 | Castro |
| 5,454,024 | A | 9/1995 | Lebowitz |
| 5,457,737 | A | 10/1995 | Wen |
| 5,461,390 | A | 10/1995 | Hoshen |
| 5,465,289 | A | 11/1995 | Kennedy |
| 5,469,497 | A | 11/1995 | Pierce et al. |
| 5,470,233 | A | 11/1995 | Fuchterman |
| 5,479,408 | A | 12/1995 | Will |
| 5,479,482 | A | 12/1995 | Grimes |
| 5,485,161 | A | 1/1996 | Vaughn |
| 5,485,163 | A | 1/1996 | Singer |
| 5,485,505 | A | 1/1996 | Norman et al. |
| 5,488,563 | A | 1/1996 | Chazelle |
| 5,497,149 | A | 3/1996 | Fast |
| 5,502,761 | A | 3/1996 | Duncan et al. |
| 5,506,893 | A | 4/1996 | Buscher et al. |
| 5,508,931 | A | 4/1996 | Snider |
| 5,509,056 | A | 4/1996 | Ericsson et al. |
| 5,513,243 | A | 4/1996 | Kage |
| 5,515,287 | A | 5/1996 | Hakoyama |
| 5,517,555 | A | 5/1996 | Amadon et al. |
| 5,517,559 | A | 5/1996 | Hayashi et al. |
| 5,519,403 | A | 5/1996 | Bickley |
| 5,532,690 | A | 7/1996 | Hertel |
| 5,535,434 | A | 7/1996 | Siddoway |
| 5,539,398 | A | 7/1996 | Hall |
| 5,543,776 | A | 8/1996 | L'Esperance |
| 5,550,897 | A | 8/1996 | Seiderman |
| 5,552,772 | A | 9/1996 | Janky |
| 5,555,286 | A | 9/1996 | Tendler |
| 5,568,119 | A | 10/1996 | Schipper |
| 5,570,416 | A | 10/1996 | Kroll |
| 5,574,648 | A | 11/1996 | Pilley |
| 5,577,100 | A | 11/1996 | McGregor et al. |
| 5,579,372 | A | 11/1996 | Astrom |
| 5,579,376 | A | 11/1996 | Kennedy, III et al. |
| 5,583,918 | A | 12/1996 | Nakagawa |
| 5,586,175 | A | 12/1996 | Hogan et al. |
| 5,588,009 | A | 12/1996 | Will |
| 5,592,535 | A | 1/1997 | Klotz |
| 5,604,486 | A | 2/1997 | Lauro |
| 5,606,313 | A | 2/1997 | Allen |
| 5,606,850 | A | 3/1997 | Nakamura |
| 5,610,815 | A | 3/1997 | Gudat |

(56) References Cited

U.S. PATENT DOCUMENTS

| | | |
|---|---|---|
| 5,610,972 A | 3/1997 | Emery et al. |
| 5,614,890 A | 3/1997 | Fox |
| 5,615,116 A | 3/1997 | Gudat |
| 5,621,793 A | 4/1997 | Bednarek et al. |
| 5,625,669 A | 4/1997 | McGregor et al. |
| 5,628,051 A | 5/1997 | Salin |
| 5,633,912 A | 5/1997 | Tsoi |
| 5,640,447 A | 6/1997 | Fonseca |
| 5,673,306 A | 9/1997 | Amadon |
| 5,682,600 A | 10/1997 | Salin |
| 5,692,037 A | 11/1997 | Friend |
| 5,719,918 A | 2/1998 | Serbetciouglu |
| 5,722,067 A | 2/1998 | Fougnies et al. |
| 5,732,346 A | 3/1998 | Lazarides |
| 5,740,534 A | 4/1998 | Ayerst |
| 5,761,618 A | 6/1998 | Lynch |
| 5,767,795 A | 6/1998 | Schaphorst |
| 5,768,509 A | 6/1998 | Gunluk |
| 5,774,533 A | 6/1998 | Patel |
| 5,778,313 A | 7/1998 | Fougnies |
| 5,787,357 A | 7/1998 | Salin |
| 5,790,636 A | 8/1998 | Marshall |
| 5,793,859 A | 8/1998 | Matthews |
| 5,794,142 A | 8/1998 | Vanttila et al. |
| 5,797,091 A | 8/1998 | Clise |
| 5,797,094 A | 8/1998 | Houde et al. |
| 5,797,096 A | 8/1998 | Lupien |
| 5,802,492 A | 9/1998 | Delorme |
| 5,806,000 A | 9/1998 | Vo |
| 5,815,816 A | 9/1998 | Isumi |
| 5,822,700 A | 10/1998 | Hultt |
| 5,826,185 A | 10/1998 | Wise et al. |
| 5,828,740 A | 10/1998 | Khuc |
| 5,850,599 A | 12/1998 | Seiderman |
| 5,854,975 A | 12/1998 | Fougnies et al. |
| 5,856,974 A | 1/1999 | Gervais |
| 5,889,473 A | 3/1999 | Wicks |
| 5,905,736 A | 5/1999 | Ronen et al. |
| 5,920,821 A | 7/1999 | Seaholtz |
| 5,930,701 A | 7/1999 | Skog |
| 5,940,755 A | 8/1999 | Scott |
| 5,943,399 A | 8/1999 | Bannister |
| 5,946,629 A | 8/1999 | Sawyer |
| 5,946,630 A | 8/1999 | Willars |
| 5,950,130 A | 9/1999 | Coursey |
| 5,953,398 A | 9/1999 | Hill |
| 5,974,054 A | 10/1999 | Couts |
| 5,974,133 A | 10/1999 | Fleischer |
| 5,978,685 A | 11/1999 | Laiho |
| 5,983,091 A | 11/1999 | Rodriguez |
| 5,987,323 A | 11/1999 | Huotari |
| 5,999,811 A | 12/1999 | Molne |
| 6,029,062 A | 2/2000 | Hanson |
| 6,035,025 A | 3/2000 | Hanson |
| 6,038,444 A | 3/2000 | Schipper |
| 6,049,710 A | 4/2000 | Nilsson |
| 6,058,300 A | 5/2000 | Hanson |
| 6,064,875 A | 5/2000 | Morgan |
| 6,070,067 A | 5/2000 | Nguyen |
| 6,073,004 A | 6/2000 | Balachandran |
| 6,073,015 A | 6/2000 | Berggren et al. |
| 6,075,982 A | 6/2000 | Donovan et al. |
| 6,081,508 A | 6/2000 | West |
| 6,101,378 A | 8/2000 | Barabash |
| 6,115,458 A | 9/2000 | Taskett |
| 6,119,014 A | 9/2000 | Alperovich et al. |
| 6,122,503 A | 9/2000 | Daly |
| 6,122,520 A | 9/2000 | Want |
| 6,138,158 A | 10/2000 | Boyle et al. |
| 6,148,197 A | 11/2000 | Bridges |
| 6,148,198 A | 11/2000 | Anderson |
| 6,149,353 A | 11/2000 | Nilsson |
| 6,157,823 A | 12/2000 | Fougnies et al. |
| 6,169,891 B1 | 1/2001 | Gorham et al. |
| 6,173,181 B1 | 1/2001 | Losh |
| 6,181,935 B1 | 1/2001 | Gossman |
| 6,188,752 B1 | 2/2001 | Lesley |
| 6,195,543 B1 | 2/2001 | Granberg |
| 6,198,431 B1 | 3/2001 | Gibson |
| 6,199,045 B1 | 3/2001 | Giniger |
| 6,205,330 B1 | 3/2001 | Windbladh |
| 6,208,854 B1 | 3/2001 | Roberts |
| 6,208,870 B1 | 3/2001 | Lorello et al. |
| 6,223,046 B1 | 4/2001 | Hamill-Keays et al. |
| 6,226,529 B1 | 5/2001 | Bruno |
| 6,249,680 B1 | 6/2001 | Wax |
| 6,249,744 B1 | 6/2001 | Morita |
| 6,266,614 B1 | 7/2001 | Alumbaugh |
| 6,289,373 B1 | 9/2001 | Dezonno |
| 6,314,108 B1 | 11/2001 | Ramasubramani |
| 6,317,594 B1 | 11/2001 | Gossman |
| 6,321,257 B1 | 11/2001 | Kotola et al. |
| 6,327,479 B1 | 12/2001 | Mikkola |
| 6,335,968 B1 | 1/2002 | Malik |
| 6,356,630 B1 | 3/2002 | Cai et al. |
| 6,370,373 B1 | 4/2002 | Gerth |
| 6,373,930 B1 | 4/2002 | McConnel et al. |
| 6,381,316 B2 | 4/2002 | Joyce et al. |
| 6,381,535 B1 | 4/2002 | Durocher et al. |
| 6,393,014 B1 | 5/2002 | Daly et al. |
| 6,393,269 B1 | 5/2002 | Hartmaier et al. |
| 6,396,913 B1 | 5/2002 | Perkins, III |
| 6,397,054 B1 | 5/2002 | Hoirup et al. |
| 6,397,055 B1 | 5/2002 | McHenry et al. |
| 6,421,707 B1 | 7/2002 | Miller |
| 6,442,257 B1 | 8/2002 | Gundlach |
| 6,456,852 B2 | 9/2002 | Bar et al. |
| 6,473,622 B1 | 10/2002 | Meuronen |
| 6,483,907 B1 | 11/2002 | Wong et al. |
| 6,487,180 B1 | 11/2002 | Borgstahl |
| 6,487,602 B1 | 11/2002 | Thakker |
| 6,490,450 B1 | 12/2002 | Batni et al. |
| 6,496,690 B1 | 12/2002 | Cobo |
| 6,505,046 B1 | 1/2003 | Baker |
| 6,507,589 B1 | 1/2003 | Ramasubramani |
| 6,512,930 B2 | 1/2003 | Sandegren |
| 6,526,335 B1 | 2/2003 | Treyz et al. |
| 6,526,351 B2 | 2/2003 | Whitham |
| 6,529,593 B2 | 3/2003 | Nelson |
| 6,529,732 B1 | 3/2003 | Vainiomaki et al. |
| 6,587,688 B1 | 7/2003 | Chambers et al. |
| 6,609,004 B1 | 8/2003 | Morse |
| 6,621,810 B1 | 9/2003 | Leung |
| 6,654,786 B1 | 11/2003 | Fox et al. |
| 6,667,688 B1 | 12/2003 | Menard et al. |
| 6,677,894 B2 | 1/2004 | Sheynblat |
| 6,690,940 B1 | 2/2004 | Brown |
| 6,728,353 B1 | 4/2004 | Espejo |
| 6,728,635 B2 | 4/2004 | Hamada |
| 6,731,943 B1 | 5/2004 | McCormick |
| 6,782,258 B2 | 8/2004 | Ung |
| 6,868,074 B1 | 3/2005 | Hanson |
| 6,879,835 B2 | 4/2005 | Greene |
| 6,915,138 B2 | 7/2005 | Kraft |
| 6,952,575 B1 | 10/2005 | Countryman |
| 6,970,869 B1 | 11/2005 | Slaughter et al. |
| 6,985,742 B1 | 1/2006 | Giniger |
| 6,993,325 B1 | 1/2006 | Waesterlid |
| 7,020,480 B2 | 3/2006 | Coskun |
| 7,072,665 B1 | 7/2006 | Blumberg |
| 7,110,773 B1 | 9/2006 | Wallace |
| 7,120,418 B2 | 10/2006 | Herajarvi |
| 7,123,874 B1 | 10/2006 | Brennan |
| 7,127,264 B2 | 10/2006 | Hronek |
| 7,130,383 B2 | 10/2006 | Naidoo et al. |
| 7,180,415 B2 | 2/2007 | Bankert et al. |
| 7,224,696 B2 | 5/2007 | Bouleros |
| 7,240,108 B2 | 7/2007 | Smith |
| 7,260,836 B2 | 8/2007 | Roskind |
| 7,317,705 B2 | 1/2008 | Hanson |
| 7,328,031 B2 | 2/2008 | Kraft |
| 7,356,328 B1 | 4/2008 | Espejo |
| 7,386,588 B2 | 6/2008 | Mousseau |
| 7,392,038 B1 | 6/2008 | Ratschunas |

(56) References Cited

U.S. PATENT DOCUMENTS

| | | |
|---|---|---|
| 7,409,428 B1 | 8/2008 | Brabec |
| 7,437,348 B1 | 10/2008 | Wyett |
| 7,480,915 B2 | 1/2009 | Costa Requena |
| 7,486,641 B2 | 2/2009 | Reddy |
| 7,522,182 B2 | 4/2009 | Bang |
| 7,577,431 B2 | 8/2009 | Jiang |
| 7,864,927 B2 | 1/2011 | Loizeaux |
| 7,969,959 B2 * | 6/2011 | Dabbs, III ............... H04W 4/06 340/441 |
| 8,014,945 B2 | 9/2011 | Cooper |
| 8,200,291 B2 | 6/2012 | Steinmetz |
| 8,300,529 B2 | 10/2012 | Strub |
| 2001/0006889 A1 | 7/2001 | Kraft |
| 2001/0031641 A1 | 10/2001 | Ung et al. |
| 2001/0034224 A1 | 10/2001 | McDowell et al. |
| 2001/0040949 A1 | 11/2001 | Blonder |
| 2002/0013153 A1 | 1/2002 | Wilcock |
| 2002/0068546 A1 | 6/2002 | Plush |
| 2002/0093435 A1 | 7/2002 | Baron |
| 2002/0098851 A1 | 7/2002 | Walczak |
| 2002/0103762 A1 | 8/2002 | Lopez |
| 2002/0133568 A1 | 9/2002 | Smith et al. |
| 2002/0143946 A1 | 10/2002 | Crosson |
| 2002/0168986 A1 | 11/2002 | Lau et al. |
| 2002/0183072 A1 | 12/2002 | Steinbach |
| 2003/0008661 A1 | 1/2003 | Joyce |
| 2003/0017832 A1 | 1/2003 | Anderson |
| 2003/0022664 A1 | 1/2003 | Goldstein |
| 2003/0040300 A1 | 2/2003 | Bodic |
| 2003/0051041 A1 | 3/2003 | Kalavade |
| 2003/0058096 A1 | 3/2003 | Shteyn |
| 2003/0086422 A1 | 5/2003 | Klinker et al. |
| 2003/0105864 A1 | 6/2003 | Mulligan |
| 2003/0119525 A1 | 6/2003 | Rajkotia |
| 2003/0120826 A1 | 6/2003 | Shay |
| 2003/0125045 A1 | 7/2003 | Riley |
| 2003/0155413 A1 | 8/2003 | Kovesdi |
| 2003/0163730 A1 | 8/2003 | Roskind |
| 2003/0186710 A1 | 10/2003 | Muhonen |
| 2003/0187803 A1 | 10/2003 | Pitt |
| 2003/0193967 A1 | 10/2003 | Fenton |
| 2003/0210656 A1 | 11/2003 | Biacs |
| 2004/0030659 A1 | 2/2004 | Gueh |
| 2004/0078340 A1 | 4/2004 | Evans |
| 2004/0103431 A1 | 5/2004 | Davenport et al. |
| 2004/0110524 A1 | 6/2004 | Takano |
| 2004/0176104 A1 | 9/2004 | Arcens |
| 2004/0176123 A1 | 9/2004 | Chin |
| 2004/0196858 A1 | 10/2004 | Tsai |
| 2004/0199614 A1 | 10/2004 | Shenfield et al. |
| 2004/0203756 A1 | 10/2004 | Lin |
| 2004/0209594 A1 | 10/2004 | Naboulsi |
| 2005/0003803 A1 | 1/2005 | Buckley |
| 2005/0004968 A1 | 1/2005 | Mononen |
| 2005/0020287 A1 | 1/2005 | Pohutsky et al. |
| 2005/0048948 A1 | 3/2005 | Holland et al. |
| 2005/0064884 A1 | 3/2005 | Dumont |
| 2005/0101338 A1 | 5/2005 | Kraft |
| 2005/0132060 A1 | 6/2005 | Mo |
| 2005/0135569 A1 | 6/2005 | Dickinson |
| 2005/0141522 A1 | 6/2005 | Kadar |
| 2005/0164721 A1 | 7/2005 | Yeh |
| 2005/0176445 A1 | 8/2005 | Qu |
| 2005/0186974 A1 | 8/2005 | Cai |
| 2005/0190789 A1 | 9/2005 | Salkini |
| 2005/0239480 A1 | 10/2005 | Kim |
| 2005/0261012 A1 | 11/2005 | Weiser |
| 2005/0265536 A1 | 12/2005 | Smith |
| 2005/0273442 A1 | 12/2005 | Bennett |
| 2005/0282518 A1 | 12/2005 | D'Evelyn |
| 2006/0030337 A1 | 2/2006 | Nowak |
| 2006/0053197 A1 | 3/2006 | Yoshimura |
| 2006/0058951 A1 | 3/2006 | Cooper |
| 2006/0063536 A1 | 3/2006 | Kim |
| 2006/0094403 A1 | 5/2006 | Norefors |
| 2006/0109960 A1 | 5/2006 | D'Evelyn |
| 2006/0148415 A1 | 7/2006 | Hamalainen |
| 2006/0183460 A1 | 8/2006 | Srinivasan et al. |
| 2006/0194595 A1 | 8/2006 | Myllynen |
| 2006/0225090 A1 | 10/2006 | Shim et al. |
| 2006/0274696 A1 | 12/2006 | Krishnamurthi |
| 2006/0281470 A1 | 12/2006 | Shi |
| 2007/0021098 A1 | 1/2007 | Rhodes |
| 2007/0037586 A1 | 2/2007 | Kim |
| 2007/0101411 A1 | 5/2007 | Babi |
| 2007/0110076 A1 | 5/2007 | Brouwer |
| 2007/0136132 A1 | 6/2007 | Weiser |
| 2007/0243885 A1 | 10/2007 | Shim |
| 2008/0081646 A1 | 4/2008 | Morin |
| 2008/0098225 A1 | 4/2008 | Baysinger |
| 2008/0268769 A1 | 10/2008 | Brown |
| 2009/0029675 A1 | 1/2009 | Steinmetz |
| 2009/0258632 A1 * | 10/2009 | Sun ..................... H04L 12/5875 455/412.1 |
| 2010/0076767 A1 | 3/2010 | Vieri |
| 2010/0120412 A1 | 5/2010 | Tang |
| 2010/0167691 A1 | 7/2010 | Howarter |
| 2010/0304766 A1 * | 12/2010 | Goyal ..................... H04L 51/34 455/466 |
| 2011/0009086 A1 | 1/2011 | Poremba |
| 2011/0064205 A1 | 3/2011 | Boni |
| 2011/0109468 A1 | 5/2011 | Hirschfeld |
| 2011/0151852 A1 | 6/2011 | Olincy |
| 2013/0013698 A1 * | 1/2013 | Relyea ................... H04L 67/06 709/206 |
| 2013/0340094 A1 * | 12/2013 | Majeti .................... H04L 63/04 726/28 |

FOREIGN PATENT DOCUMENTS

| | | |
|---|---|---|
| NO | PCT/NO99/00178 | 6/1997 |
| SE | PCT/SE98/00992 | 5/1998 |
| SE | PCT/SE99/00875 | 5/1999 |

OTHER PUBLICATIONS

Robbrock, The Intelligent Network—Changing the Face of Telecommunications, IEEE, Jan. 1991, pp. BCG 21207-BCG 21220.

MultiMedia Publishing Corp., "Prepaid Cellular and Prepaid Wireless Market Report and Forecast 1997-2002," sales literature, undated.

NEXTLINK, "Introducing a New Prepaid Telephone Service from NEXTLINK," sales literature, undated.

Open Development Corp., "openMedia Cellular Prepaid," sales literature, undated.

Tecore, Inc., "Pre-Paid Cellular," sales literature, Mar. 25, 1997, pp. 1-4.

Open Mobile Alliance, user Plane Location Protocol Candidate Version 1.0, OMA-TS-ULP-V1_0-20060127-C, Jan. 27, 2006, pp. 1-65.

International Search Report received in PCT/US2012/062204 dated Jan. 9, 2013.

The Power of Mobile Unified Messaging; Siemans and Comverse to Demonstrate WAP-Based Messaging Applications on Live GBRS System, Comverse, Feb. 2000.

Open Mobile Alliance, Secure User Plane Location Architecture Candidate Version 1.0, OMA-AD-SUPL-V1_0-20060127-C, Jan. 27, 2006, pp. 1-77.

Le-Pond Chin, The Study of the Interconnection of GSM Mobile Communication System Over IP Based Network, IEEE, pp. 2219-2223.

* cited by examiner

READ ACKNOWLEDGEMENT INTEROPERABILITY FOR TEXT MESSAGING AND IP MESSAGING

The present invention claims priority from U.S. Provisional No. 61/889,231 to Lewis Tuttle et al. entitled "Read Acknowledgement Interoperability for Text Messaging and IP Messaging", filed Oct. 10, 2013, the entirety of which is expressly incorporated herein by reference.

BACKGROUND OF THE INVENTION

1. Field of the Invention

This invention relates generally to wireless telecommunications, and more particularly to short message service and Internet Protocol (IP) messaging.

2. Background of Related Art

A short message service (SMS) is a service that enables bidirectional transmission of short alpha-numeric messages to and from a Short Message Entity (SME), i.e., a device or system capable of sending and receiving short messages.

A read acknowledgement feature for the short message service (SMS) is a feature that delivers an SMS message with a timestamp (i.e. an SMS read acknowledgement) to an SMS sending device, to indicate an approximate time at which an SMS message sent from that SMS sending device was opened at an SMS recipient device. The existing Delivery-Ack is generated by the SMSC indicating that delivery has been successful, while Read-Ack is generated by the receiving entity.

The short message service (SMS) conventionally supports read acknowledgement through an IS637 (Code Division Multiple Access (CDMA)) short message interface and a Short Message Peer-to-Peer (SMPP) protocol. Current technology does not define interoperability between Code Division Multiple Access (CDMA) (3GPP2), Short Message Peer-to-Peer (SMPP) protocol, Global System for Mobile Communications (GSM) (3GPP1), Long Term Evolution (LTE), and Mobility Management Entity (MME) interfaces. Moreover, mobile use cases for the short message service (SMS) read acknowledgement feature are not currently defined.

Unfortunately, Global System for Mobile Communications (GSM) (3GPP) does not support read acknowledgements for the short message service (SMS). Hence, a mobile device using the GSM short message service (SMS) cannot receive a text message notification indicating a time at which an SMS message sent from that mobile device was opened at an SMS recipient device.

SUMMARY

A method for enabling global system for mobile communications (GSM) devices to support read acknowledgements for text messages (e.g. short message service (SMS) messages, internet protocol (IP) messages, etc.) comprises a read acknowledgement request Information-Element (IE) and a read acknowledgement message indicator Information-Element (IE).

In accordance with the principles of the present invention, a text message sending device (e.g. a global system for mobile communications (GSM) device) inserts an inventive read acknowledgement request Information-Element (IE) into a body of a text message (e.g. an SMS message, and IP message, etc.) to request that a read acknowledgement be returned to the sending device upon opening of the text message by a text message recipient device.

When a text message with a read acknowledgement request Information-Element (IE) is opened at a text message recipient device, the SMS recipient device acknowledges the read acknowledgement request and returns a text message read acknowledgement to the text message sending device by: populating a read acknowledgement message indicator Information-Element (IE) with relevant message data, inserting the read acknowledgement message indicator Information-Element (IE) into a text message (e.g. SMS message, IP message, etc.), and forwarding the read acknowledgement text message back to the text message sending device.

In accordance with the principles of the present invention, a read acknowledgement message indicator Information-Element (IE) inserted in a read acknowledgement comprises a message value (i.e. a message reference) to enable a mobile device to associate the read acknowledgement with a particular text message, e.g., SMS message, IP message, etc.

In accordance with the principles of the present invention, a short message service center (SMSC) supports interoperability between global system for mobile communications (GSM) (3GPP) read acknowledgements (Read Ack), code division multiple access (CDMA) (3GPP2) read acknowledgements (Read Ack), internet protocol (IP) multimedia subsystem (IMS) read acknowledgements (Read Ack), mobile management entity (MME) read acknowledgements (Read Ack), and short message peer-to-peer (SMPP) read acknowledgements (Read Ack).

The use of information-elements for read acknowledgements within the present invention permits read acknowledgements to include full enhanced messaging service (EMS) content.

BRIEF DESCRIPTION OF THE DRAWINGS

Features and advantages of the present invention will become apparent to those skilled in the art from the following description with reference to the drawings, in which.

DETAILED DESCRIPTION OF ILLUSTRATIVE EMBODIMENTS

Figure 1:
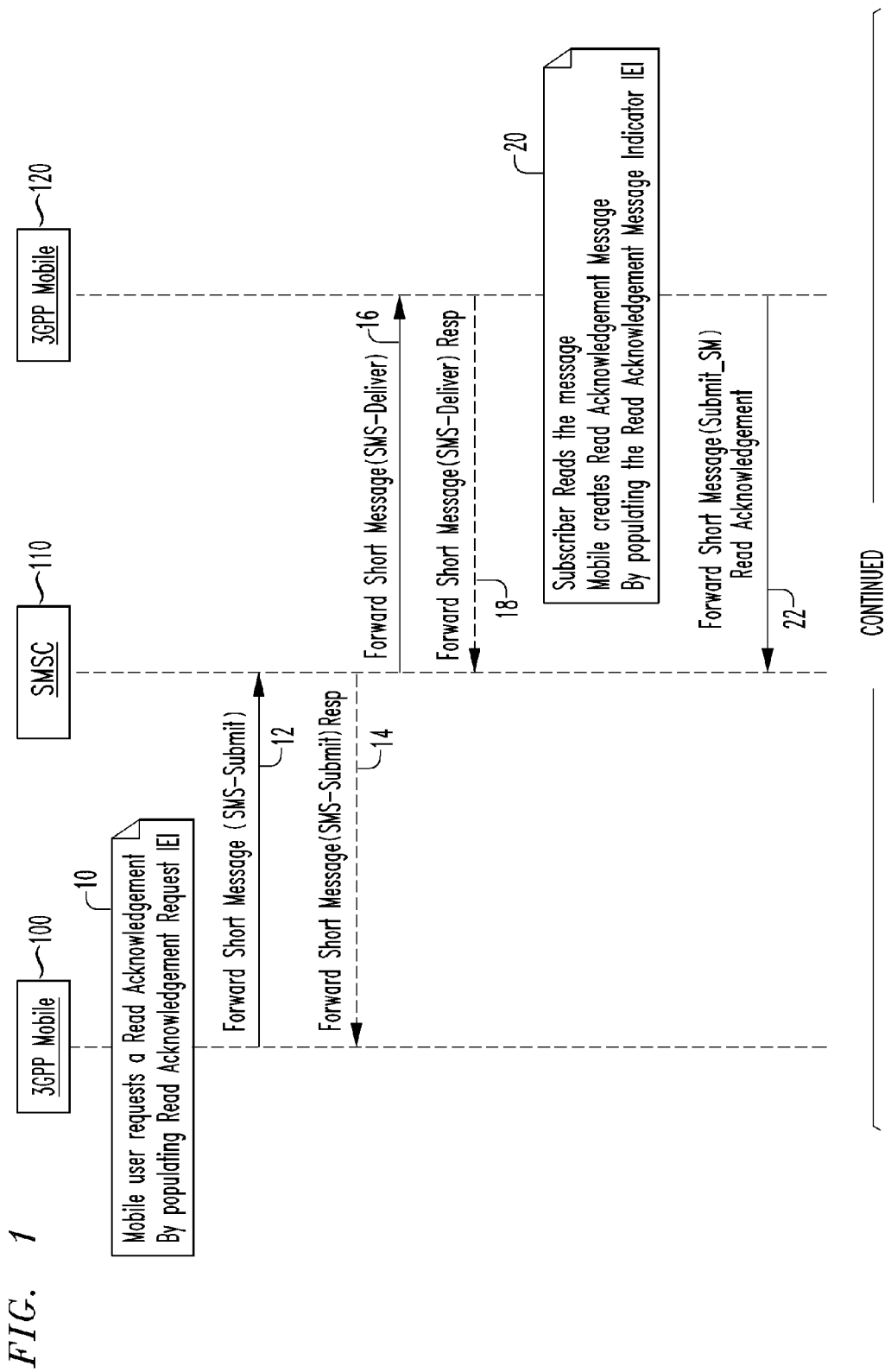
FIG. 1 shows an exemplary flow of a global system for mobile communications (GSM) (3GPP) mobile originated (MO) to global system for mobile communications (GSM) (3GPP) mobile terminated (MT) read acknowledgement, in accordance with the principles of the present invention.
Figure 1:
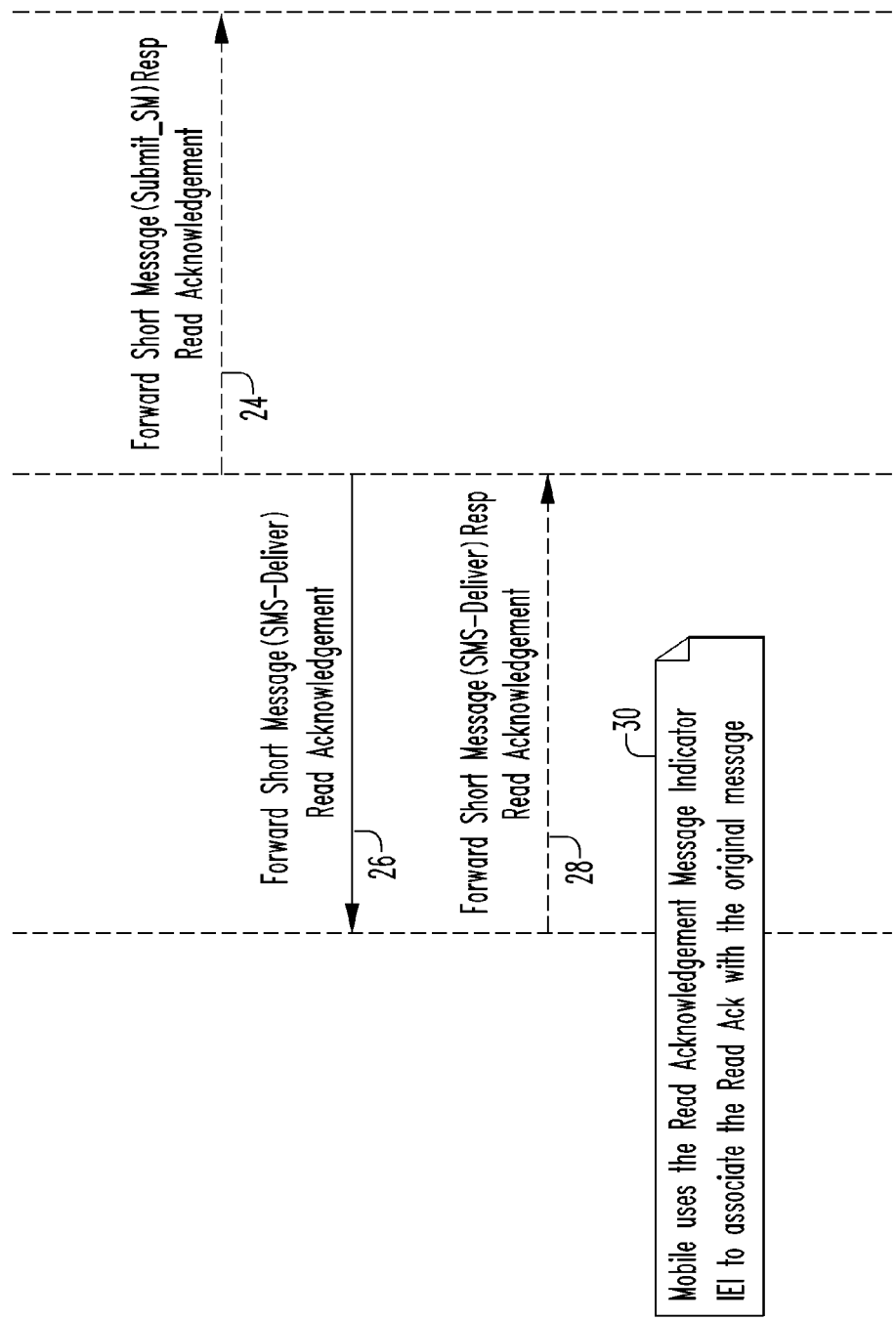

The present invention comprises a method that enables global system for mobile communications (GSM) (3GPP) devices to support read acknowledgements for text messages, e.g., short message service (SMS) messages, internet protocol (IP) messages, etc.

A conventional read acknowledgement feature for a text message service (e.g. a short message service, an internet protocol message service, etc.) is a feature that delivers a text message with a timestamp (i.e. an SMS read acknowledgement) to a text message sending device to indicate an approximate time at which a text message sent from that text message sending device was opened at a text message recipient device. GSM devices do not conventionally support read acknowledgements for text messages, e.g., SMS messages, IP messages, etc.

In accordance with the principles of the present invention, information-elements (IE) are used to enable global system for mobile communications (GSM) (3GPP) devices to support read acknowledgements for text messages, e.g., short message service (SMS) messages, internet protocol (IP) messages, etc. An Information-Element-Identifier is the first octet of an Information-Element and gives the type of the data. As used herein, the "C0" and "C1" values are the Information-Element-Identifiers for the two Information-Elements discussed in the disclosed embodiments of the invention.

In particular, prior to sending a text message to a text message recipient device, a sending device may insert an inventive read acknowledgement request Information-Element (IE) into the body of the text message to request that a read acknowledgement be returned to the sending device upon opening.

When a text message with a read acknowledgement request Information-Element (IE) is opened at a text message recipient device, the text message recipient device acknowledges the read acknowledgment request and returns a text message read acknowledgement to the text message sending device. A text message read acknowledgement includes a read acknowledgment message indicator Information-Element (IE) to indicate that the message is a read acknowledgement.

For example, a global system for mobile communications (GSM) device using a short message service (SMS) to send an SMS message (i.e. text message) to an SMS recipient device may insert a read acknowledgement request Information-Element (IE) into the body of the SMS message to request that a read acknowledgement be returned to the SMS sending device upon opening. An exemplary read acknowledgement request Information-Element (IE) is as follows:

TABLE 1

| Read Acknowledgement Request IEI | | |
|---|---|---|
| Tag Value (Hex) | Length (Bytes) | Value |
| C0 | 2 | Integer |

In particular, as shown in Table 1, a read acknowledgement request Information-Element (IE) preferably includes an integer value similar to a message reference used to identify an SMS message within which the read acknowledgement request Information-Element (IE) is embedded. A read acknowledgement request Information-Element (IE) is not repeatable.

A GSM device that receives an SMS message with a read acknowledgement request Information-Element (IE) (i.e. an SMS recipient device), returns a read acknowledgement to the SMS sending device upon opening (reading) the text message. An SMS read acknowledgement includes a read acknowledgement message indicator Information-Element (IE). An exemplary read acknowledgement message indicator Information-Element (IE) is as follows:

TABLE 2

| Read Acknowledgement Message Indicator IEI | | |
|---|---|---|
| Tag Value (Hex) | Length (Bytes) | Value |
| C1 | 2 | Integer |

In particular, as portrayed in Table 2, a read acknowledgement message indicator Information-Element (IE) preferably includes an integer value, identical to an integer value embedded in a corresponding read acknowledgement request Information-Element (IE). In accordance with the principles of the present invention, mobile devices use an integer value indicated in a read acknowledgement message indicator Information-Element (IE) to associate the read acknowledgement with a relevant SMS message. A read acknowledgement message indicator Information-Element (IE) is not repeatable.

FIG. 1 shows an exemplary flow of a global system for mobile communications (GSM) (3GPP) mobile originated (MO) to global system for mobile communications (GSM) (3GPP) mobile terminated (MT) read acknowledgement, in accordance with the principles of the present invention.

In particular, as depicted in step 12 of FIG. 1, to request a read acknowledgement for a particular SMS message, a GSM (3GPP) user device 100 populates a read acknowledgement request Information-Element (IE) with relevant information (step 10), embeds the read acknowledgement request Information-Element (IE) in to the body of the SMS message, and then forwards the SMS message with read acknowledgement request to a GSM (3GPP) SMS recipient device 120.

The SMS message then traverses an SMS network and is received at a short message service center (SMSC) 110, in accordance with conventional technology.

As depicted in step 14 of FIG. 1, upon receipt of the SMS message with read acknowledgement request Information-Element (IE), the short message service center (SMSC) 110 forwards an SMS submit response message to the GSM SMS sending device 100 to indicate message receipt. The short message service center (SMSC) 110 then delivers the received SMS message with read acknowledgement request Information-Element (IE), without modification, to the GSM SMS recipient device 120, as shown in step 16.

Upon receipt of the SMS message with read acknowledgement request Information-Element (IE), the GSM SMS recipient device 120 forwards an SMS deliver response to the short message service center (SMSC) 110 to indicate message receipt, as shown in step 18 of FIG. 1.

In step 20, a user on the GSM SMS recipient device 120 opens the SMS message with read acknowledgement request Information-Element (IE), prompting the GSM SMS recipient device 120 to create and return a read acknowledgement to the GSM SMS sending device 100. As portrayed in step 22, the GSM SMS recipient device creates and returns an SMS read acknowledgement by: populating a read acknowledgement message indicator Information-Element (IE) with relevant message information, inserting the read acknowledgement message indicator Information-Element (IE) into an SMS message, and then sending the SMS read acknowledgement to the short message service center (SMSC) 110 for delivery to the GSM SMS sending device 100.

As depicted in steps 24-28, the SMS read acknowledgement is received at the short message service center (SMSC) 110 and subsequently delivered to the GSM SMS sending device 100 without modification.

Upon receipt of the SMS read acknowledgement, the GSM SMS sending device 100 uses the embedded read acknowledgement message indicator Information-Element (IE) to correlate the read acknowledgement with the original SMS message, as shown in step 30.

Figure 2:
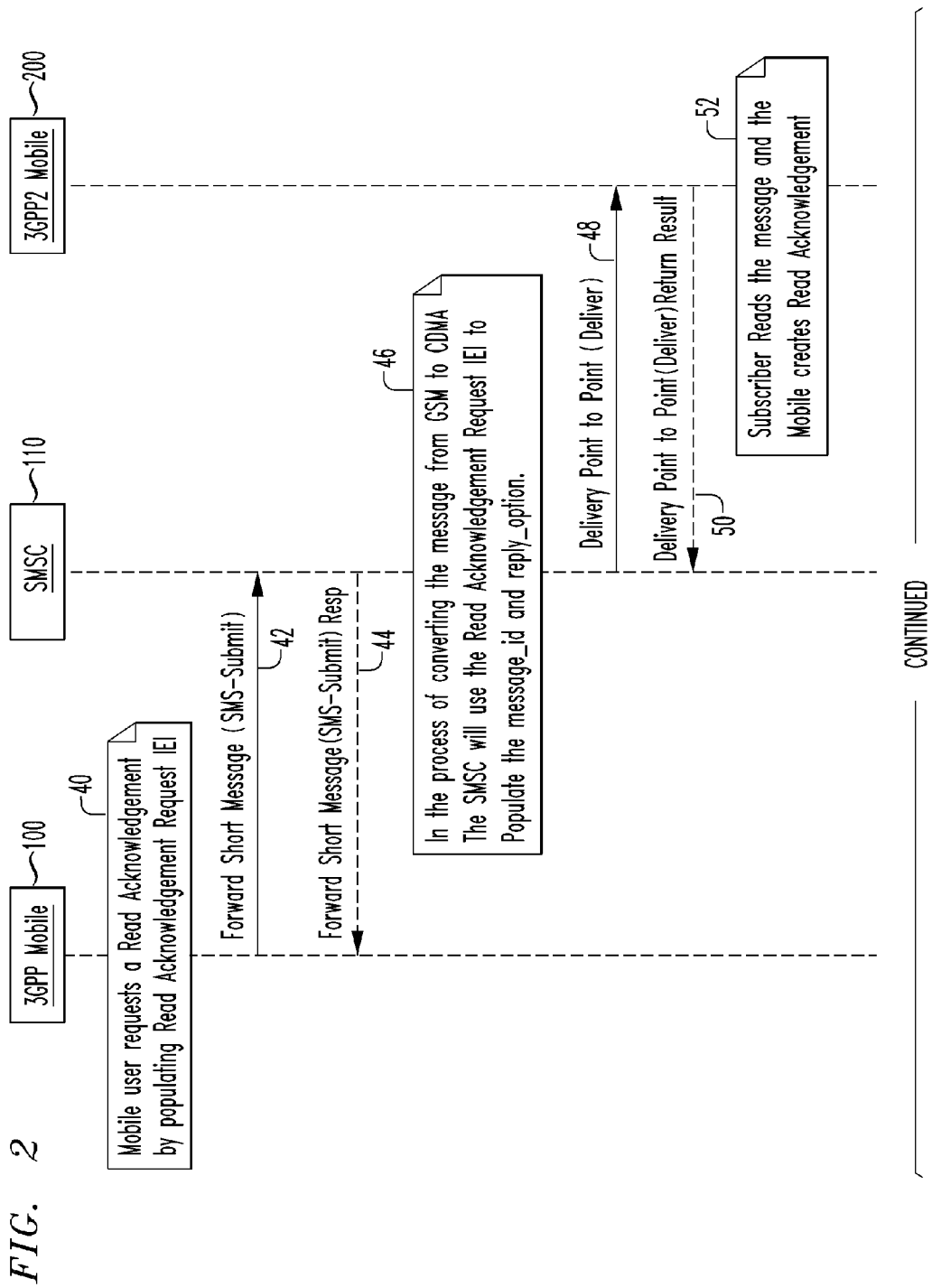
FIG. 2 shows an exemplary flow of a global system for mobile communications (GSM) (3GPP) mobile originated (MO) to code division multiple access (CDMA) (3GPP2) mobile terminated (MT) read acknowledgement, in accordance with the principles of the present invention.
Figure 2:
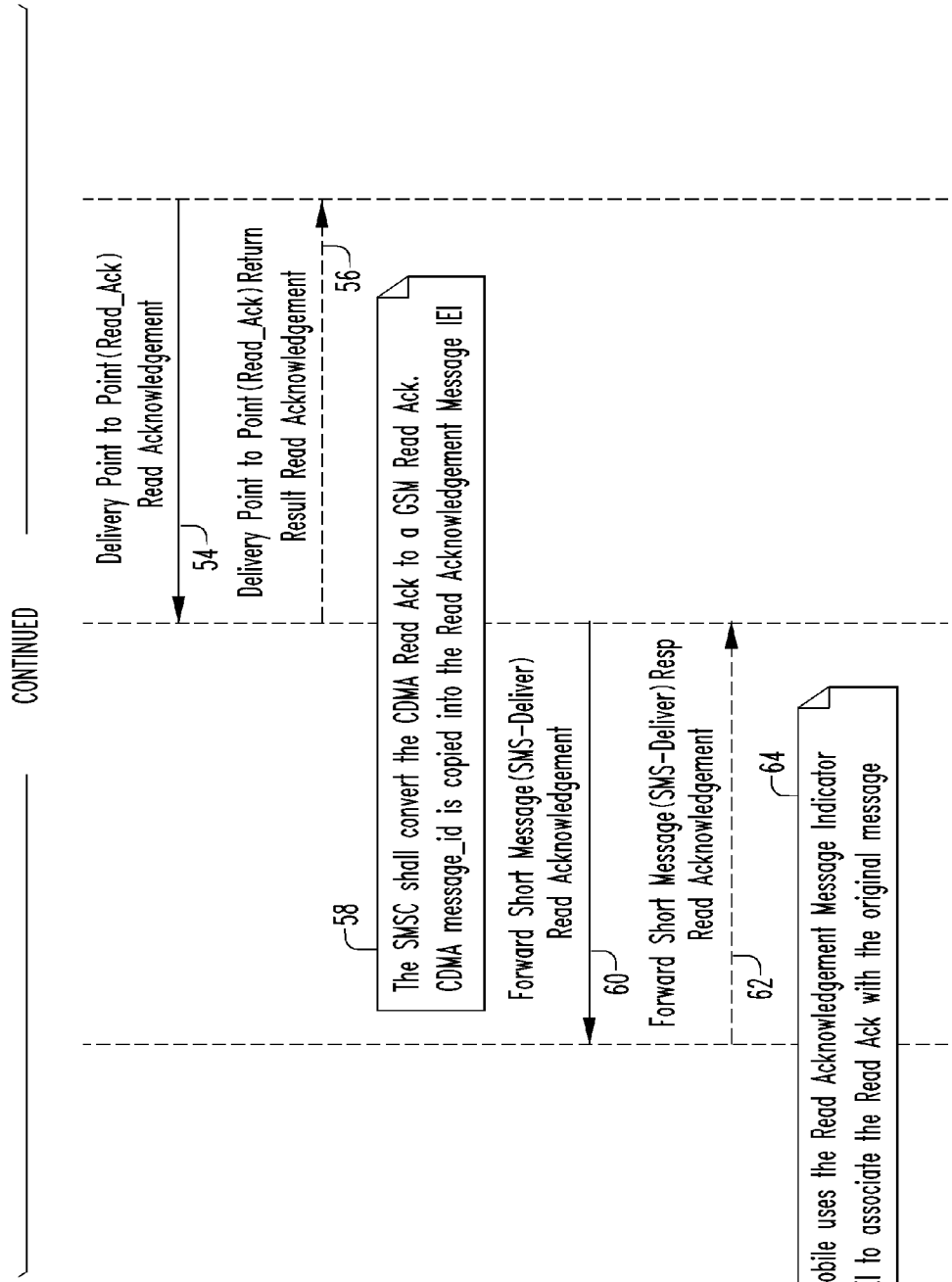

FIG. 2 shows an exemplary flow of a global system for mobile communications (GSM) (3GPP) mobile originated (MO) to code division multiple access (CDMA) (3GPP2) mobile terminated (MT) read acknowledgement, in accordance with the principles of the present invention.

In particular, as depicted in FIG. 2, to request a read acknowledgement for a particular SMS message, a global system for mobile communications (GSM) (3GPP) device 100 populates a read acknowledgement request Information-Element (IE) with relevant data (step 40), embeds the read acknowledgement request Information-Element (IE) in the SMS message, and then sends the SMS message with read acknowledgement request Information-Element (IE) to a code division multiple access (CDMA) (3GPP2) SMS recipient device 200, as shown in step 42.

The SMS message then traverses an SMS network and is received at a short message service center (SMSC) 110.

In accordance with the principles of the present invention, upon receipt of the SMS message with read acknowledgement request Information-Element (IE), the short message service center (SMSC) 110 sends an SMS submit response to the GSM SMS sending device 100 to indicate message receipt, as shown in step 44. The short message service center (SMSC) 110 then converts the SMS message from GSM to CDMA format by using the read acknowledgement request Information-Element (IE) embedded in the received SMS message to populate a CDMA mobile terminated message message_id and reply_option, as depicted in step 46. The CDMA reply_option field is preferably set to request a CDMA read acknowledgement per IS637 standards (a reply_option field in a CDMA SMS message is preferably set to '1' to indicate that a read acknowledgement is requested, otherwise reply_option is set to '0').

Once the short message service center (SMSC) 110 has finished converting the SMS message with read acknowledgement request Information-Element (IE) from GSM to CDMA format (step 46), the short message service center (SMSC) 110 forwards the SMS message with read acknowledgement request to the CDMA SMS recipient device 200 via a delivery point to point (DPP) message, as depicted in step 48 of FIG. 2. The CDMA SMS recipient device 200 then forwards a delivery point to point return result to the short message service center (SMSC) 110 to indicate message receipt, as portrayed in step 50.

In step 52, a user on the CDMA SMS recipient device 200 opens the SMS message with CDMA read acknowledgement request, prompting the CDMA SMS recipient device 200 to create and return a read acknowledgement, per IS637 standards, to the short message service center (SMSC) 110 for subsequent forwarding to the GSM SMS sending device 100, as depicted in steps 54 and 56. A bearer data message identifier field in the read acknowledgement message preferably includes message_type '0110' to indicate that the message is a read acknowledgement. In addition, a message_ID in the read acknowledgement message is preferably identical to a message_ID received in the read acknowledgement request (for correlation purposes).

In step 58 of FIG. 2, the short message service center (SMSC) 110 receives the SMS read acknowledgement from the CDMA SMS recipient device and converts the read acknowledgement (of type Read Ack '0110') from CDMA to GSM format. In particular, the short message service center (SMSC) 110 uses a message_id indicated in the CDMA read acknowledgement to populate a read acknowledgement message indicator Information-Element (IE). The short message service center (SMSC) 110 then sends the SMS read acknowledgement with read acknowledgement message indicator Information-Element (IE) to the GSM SMS sending device 100, as depicted in steps 60 and 62 of FIG. 2.

Upon receipt of the SMS read acknowledgement, the GSM SMS sending device 100 uses the read acknowledgement message indicator Information-Element (IE) to correlate the received read acknowledgement with the original SMS message (transmitted in step 42), as shown in step 64.

Figure 3:
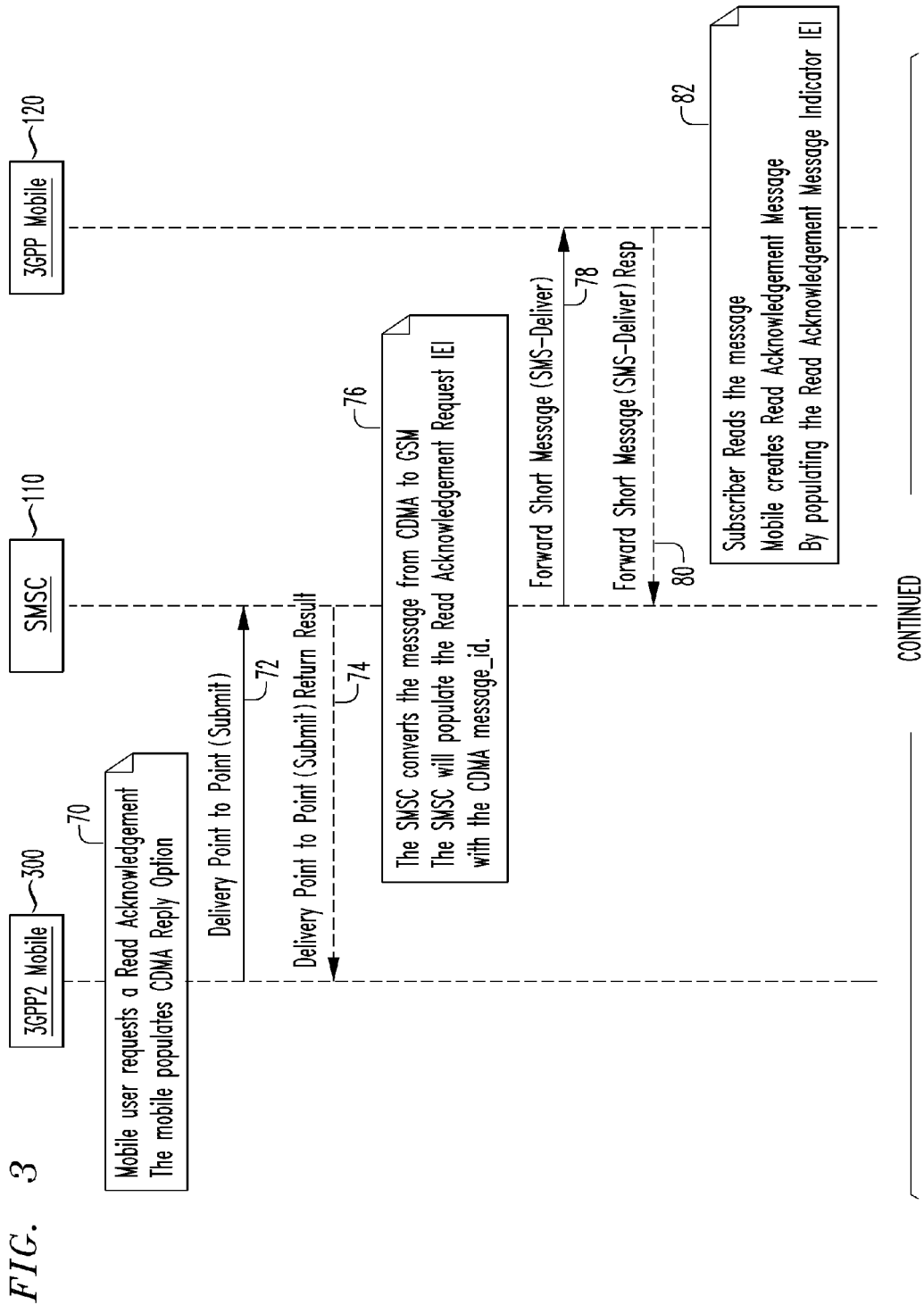
FIG. 3 shows an exemplary flow of a code division multiple access (CDMA) (3GPP2) mobile originated (MO) to global system for mobile communications (GSM) (3GPP) mobile terminated (MT) read acknowledgement, in accordance with the principles of the present invention.
Figure 3:
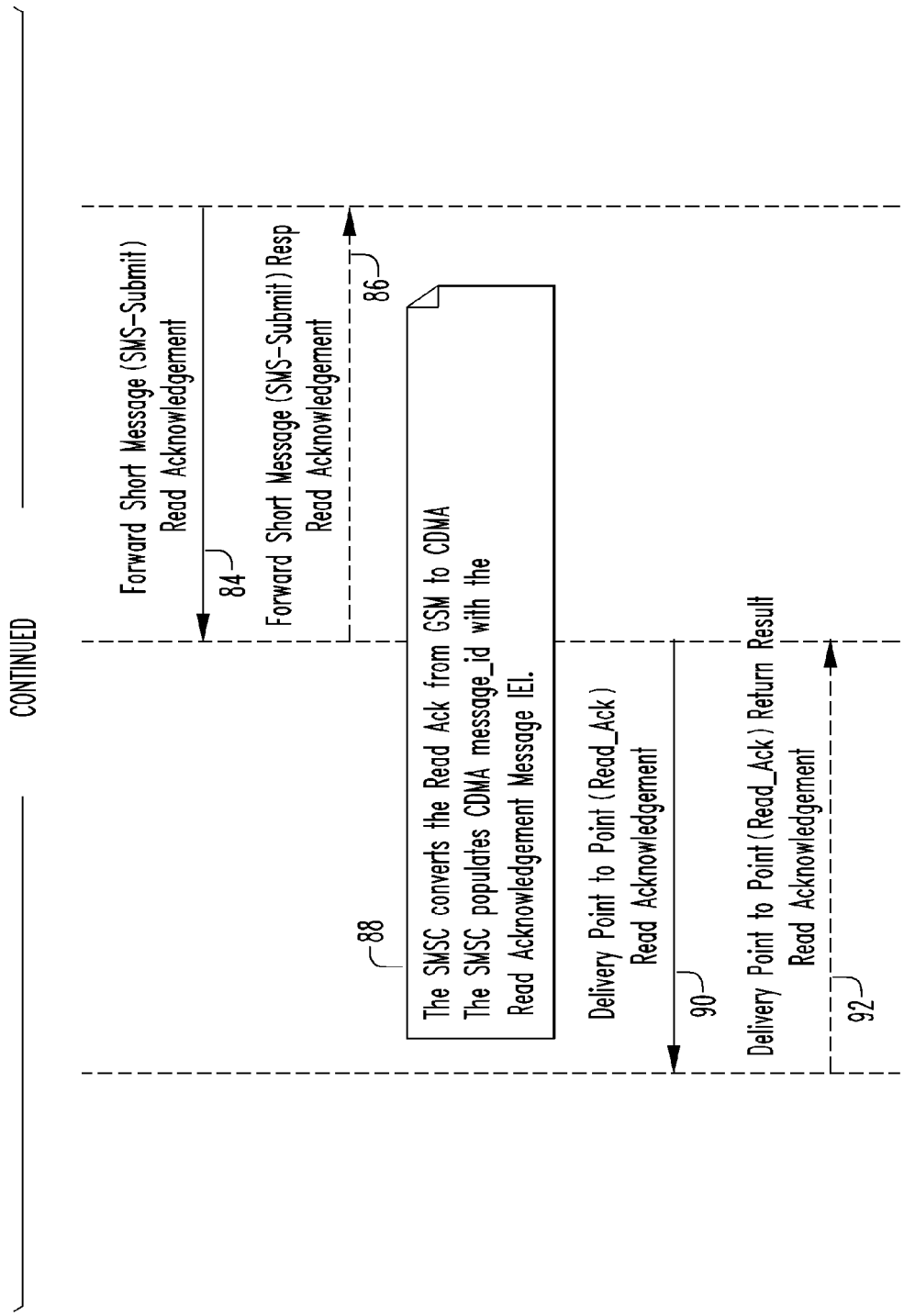

FIG. 3 shows an exemplary flow of a code division multiple access (CDMA) (3GPP2) mobile originated (MO) to global system for mobile communications (GSM) (3GPP) mobile terminated (MT) read acknowledgement, in accordance with the principles of the present invention.

In particular, as shown in FIG. 3, to request a read acknowledgement for a particular SMS message, a CDMA (3GPP2) user device 300 populates a CDMA reply_option with a relevant bit (step 70), embeds the CDMA reply_option in an SMS message, and then sends the SMS message with CDMA read acknowledgement via a point to point (P2P) connection to a GSM (3GPP) SMS recipient device 120, as depicted in step 72.

As shown in step 74 of FIG. 3, the SMS message then traverses an SMS network and is received at a short message service center (SMSC) 110. Upon receipt of the SMS message with CDMA read acknowledgement request, the short message service center (SMSC) 110 forwards a deliver point to point return result to the CDMA SMS sending device to indicate message receipt, and then converts the SMS message and read acknowledgement request from CDMA to GSM format, as depicted in step 76 of FIG. 3. In particular, the short message service center (SMSC) 110 uses a message_id embedded in the CDMA SMS message to populate a read acknowledgement request Information-Element (IE). The short message service center (SMSC) 110 then forwards the converted SMS message with read acknowledgement request Information-Element (IE) to the GSM SMS recipient device 120, as depicted in step 78 of FIG. 3. Upon receipt of the SMS message with read acknowledgement request Information-Element (IE), the GSM SMS recipient device 120 forwards an SMS deliver response to the short message service center (SMSC) 110 to indicate message receipt, as shown in step 80.

In step 82, a user on the GSM SMS recipient device 120 opens the SMS message with read acknowledgement request Information-Element (IE), prompting the GSM SMS recipient device 120 to create and return an SMS read acknowledgement to the CDMA SMS sending device 300. The GSM SMS recipient device 120 creates and returns an SMS read acknowledgement to the CDMA SMS recipient device 300 by: populating a read acknowledgement message indicator Information-Element (IE) with relevant message data, embedding the read acknowledgement message indicator Information-Element (IE) in an SMS message, and forwarding the SMS read acknowledgement to the short message service center 110 for delivery to the CDMA SMS sending device 300, as depicted in steps 84-86.

Upon receiving the read acknowledgement from the GSM SMS recipient device 120, the short message service center (SMSC) 110 converts the read acknowledgement from GSM to CDMA format, by using an integer value (message reference) indicated in the read acknowledgement message indicator Information-Element (IE) to populate a standard CDMA read acknowledgement (per IS637 standards), as shown in step 88 of FIG. 3. The short message service center (SMSC) 110 then forwards the SMS message with CDMA read acknowledgement to the CDMA SMS sending device 300, as depicted in steps 90 and 92.

Figure 4:
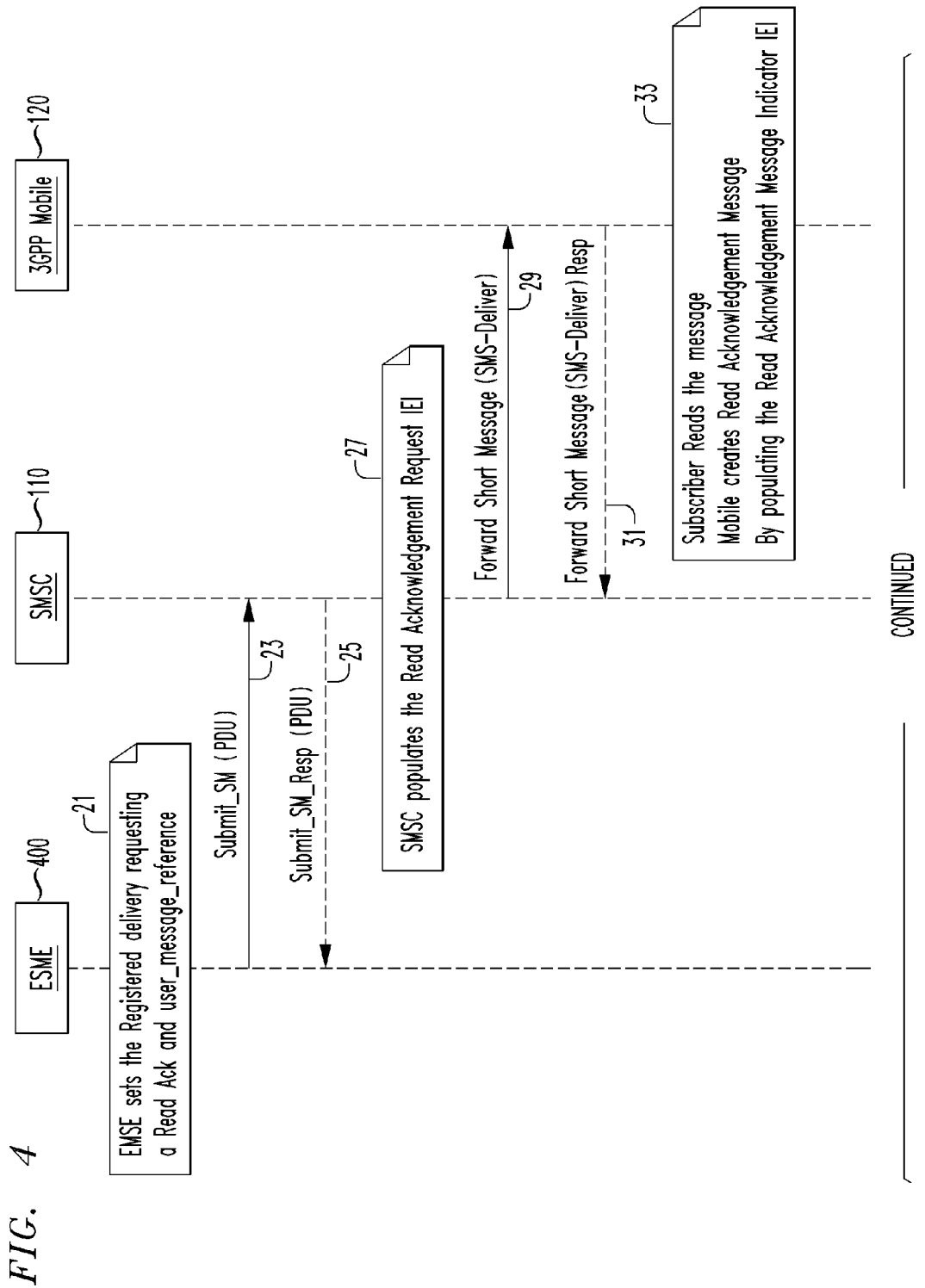
FIG. 4 shown an exemplary flow of an external short messaging entity (ESME) mobile originated (MO) to global system for mobile communications (GSM) (3GPP) mobile terminated (MT) read acknowledgement, in accordance with the principles of the present invention.
Figure 4:
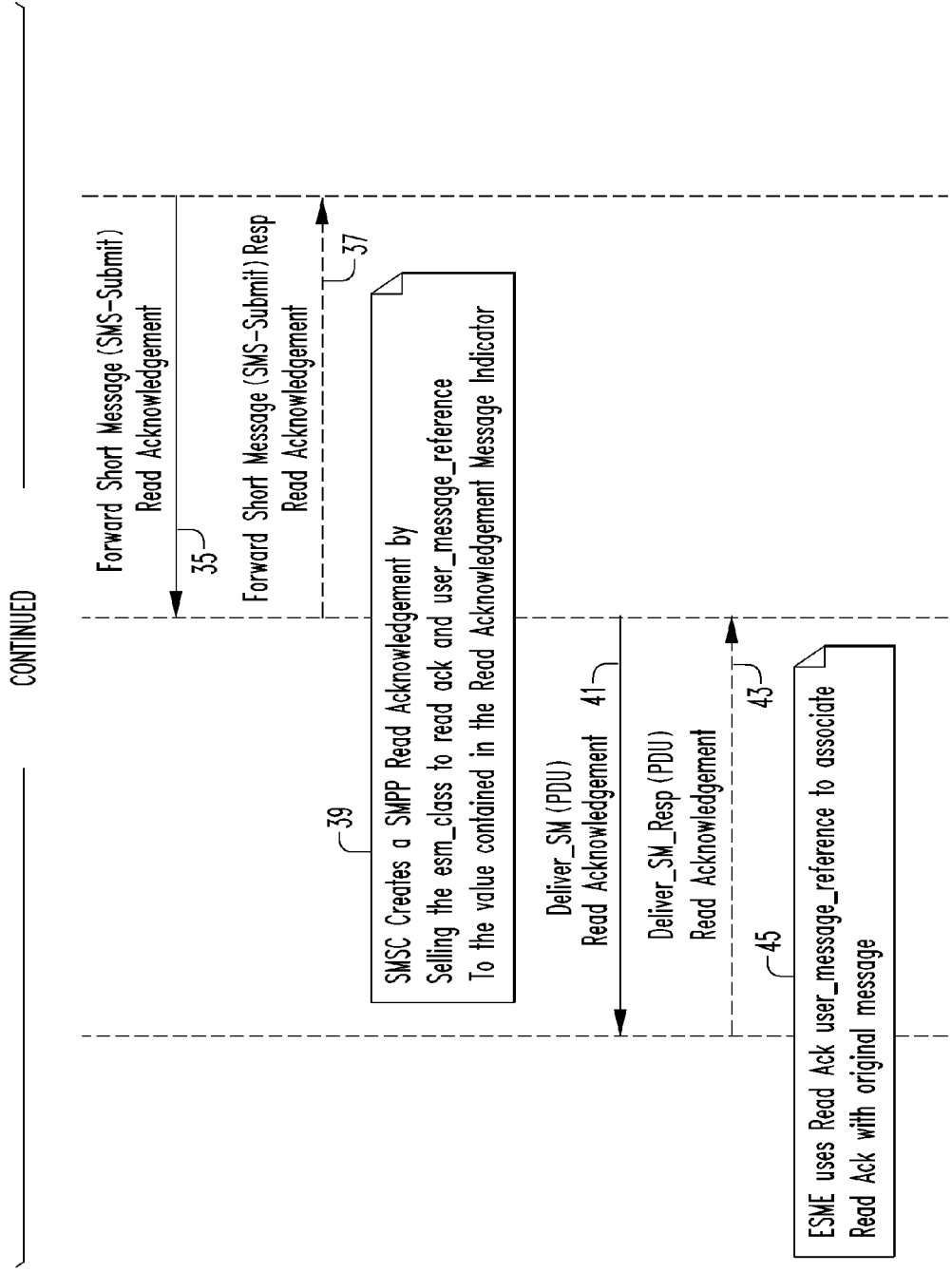

FIG. 4 shows an exemplary flow of an external short messaging entity (ESME) mobile originated (MO) to global system for mobile communications (GSM) (3GPP) mobile terminated (MT) read acknowledgement, in accordance with the principles of the present invention.

In particular, as depicted in FIG. 4, to request a read acknowledgement for a particular SMS message, an external short messaging entity (ESME) 400 sets bit 5 of a registered_delivery field and inserts a relevant user_message_reference into the SMS message (step 21). In particular, registered_delivery value, 'xx1xxxxx', conventionally indicates 'read acknowledgement requested' and registered_delivery value, 'xx0xxxxx', conventionally indicates 'no read acknowledgement requested'. The external short messaging entity (ESME) 400 then sends the SMS message with read acknowledgement request to a GSM (3GPP) SMS recipient device 120, as shown in step 23.

The SMS message then traverses an SMS network and is received at a short message service center (SMSC) 110.

In accordance with the principles of the present invention, upon receiving the SMS message with read acknowledgement request, the short message service center (SMSC) 110 forwards a submit_sm_response to the sending external short messaging entity (ESME) 400 to indicate message receipt, as depicted in step 25. The short message service center (SMSC) 110 then uses the message reference embedded in the SMS message with read acknowledgement request to populate a read acknowledgement request Information-Element (IE), as portrayed in step 27.

As shown in step 29 of FIG. 4, the short message service center (SMSC) 110 forwards the SMS message with read acknowledgement request Information-Element (IE) to the GSM SMS recipient device 120. Upon receipt of the SMS message, the GSM SMS recipient device 120 forwards an SMS deliver response to the short message service center (SMSC) 110 to indicate message receipt, as shown in step 31.

In step 33 of FIG. 4, a user on the GSM SMS recipient device 120 opens the SMS message with read acknowledgement request Information-Element (IE), prompting the GSM SMS recipient device 120 to create and return an SMS read acknowledgement to the originating external short messaging entity (ESME) 400. In accordance with the principles of the present invention, the GSM SMS recipient device 120 creates and returns an SMS read acknowledgement to the SMS originating external short messaging entity (ESME) 400 by: populating a read acknowledgement message indicator Information-Element (IE) with relevant message data (step 33), embedding the read acknowledgement message indicator Information-Element (IE) in an SMS message, and then sending the SMS read acknowledgement to the short message service center 110 for delivery to the sending external short messaging entity (ESME) 400, as shown in steps 35 and 37.

As shown in step 39 of FIG. 4, upon receiving the SMS read acknowledgement from the GSM recipient device 120, the short message service center (SMSC) 110 converts the SMS read acknowledgement from GSM to SMPP format by: setting an esm_class field of the message to 'xx0101xx', to indicate that the message is a read acknowledgement, inserting the integer value (message reference) indicated in the read acknowledgement Information-Element (IE) into a user_message_reference, and inserting an SMSC message_ID of the submitted message into a message_ID field, for message correlation purposes.

As depicted in steps 41 and 43, the short message service center (SMSC) 110 then forwards the converted read acknowledgement to the sending external short messaging entity (ESME) 400.

Upon receipt of the read acknowledgement, the external short messaging entity (ESME) 400 uses the user_message_reference indicated in the read acknowledgement to associate the read acknowledgement with the original SMS message.

A new value in ems_class and registered_delivery is assigned to support short message peer-to-peer (SMPP) read acknowledgements. In particular, to indicate that an SMS message contains a read acknowledgement in SMPP, new value, 'xx0101xx', is assigned for esm_class and used in messages sent between an external short messaging entity (ESME) 400 and a short message service center (SMSC) 110. In an SME originated acknowledgement (bit 2, 3, and 5), new registered_delivery value, 'xx0xxxxx', indicates 'no read acknowledgement requested' (default), and new registered_delivery value, 'xx1xxxxx', indicates 'read acknowledgement requested'.

The present invention comprises significant, important features, including: support for GSM SMS read acknowledgements; support for GSM read acknowledgements for over-the-top messaging; use of information-elements (IEIs) for enabling SMS read acknowledgements on GSM mobile devices (IEIs include a reference to allow a mobile device to associate a read acknowledgement with a particular SMS message); read acknowledgement interoperability between global GSM, code division multiple access (CDMA), and short message peer-to-peer (SMPP) protocols; support for including enhanced messaging service (EMS) content (i.e. emoticons, sounds, etc.) in GSM SMS read acknowledgements; and support for including location (e.g. location based emoticons, such as a house for 'home', an office building for 'work', etc.) information in GSM SMS read acknowledgements.

The present invention allows for seamless interoperability of read acknowledgements between code division multiple access (CDMA) (3GPP2) devices, global system for mobile communications (GSM) (3GPP) devices, long term evolution (LTE) devices, mobility management entities (MME), and short message peer-to-peer (SMPP) external short message entities (ESME).

The use of information-elements for read acknowledgements within the present invention enables read acknowledgements to include full enhanced messaging service (EMS) content.

In accordance with the principles of the present invention, a conventional short message service center (SMSC) (i.e. a first recipient of an SMS message en route from an originating device to a destination device) supports interoperability between global system for mobile communications (GSM) (3GPP) read acknowledgements (Read Ack), code division multiple access (CDMA) (3GPP2) read acknowledgements (Read Ack), IP multimedia subsystem (IMS) read acknowledgements (Read Ack), mobile management entity (MME) read acknowledgements (Read Ack), and short message peer-to-peer (SMPP) read acknowledgements (Read Ack).

The present invention may be used to allow a mobile device to provide a unique read acknowledgement per source address.

Conventional long term evolution (LTE) IP multimedia subsystem (IMS) networks do not allow for paging channel delivery of short messages. The short message service (SMS) SG interworking function (IWF) provides a cost effective method of implementing paging channel delivery on data-only networks. The present invention has applicability to wireless service providers.

The present invention may be implemented without requiring changes at the mobile application level or short message service center (SMSC) so as to allow for minimal network impact.

While the invention has been described with reference to the exemplary embodiments thereof, those skilled in the art will be able to make various modifications to the described embodiments of the invention without departing from the true spirit and scope of the invention.

What is claimed is:

1. A method of providing text message read acknowledgement to a mobile device sending a text message, comprising:
    inserting, by a mobile phone, a read acknowledgement request within a body of an initial text message;
    transmitting said initial text message with said read acknowledgement request within said body, addressed to a recipient mobile phone;
    receiving, by said mobile phone, a response text message from said recipient mobile phone, said response text message including a read acknowledgement indicator inserted within a body of said response text message, and said response text message further including a reference to associate said read acknowledgement indicator within said body of said initial text message; and
    associating, by said mobile phone, said read acknowledgement indicator within said body of said initial text message.

2. The method of providing text message read acknowledgement to a mobile device sending a text message according to claim 1, wherein:
    said initial text message is a short message service (SMS) text message.

3. The method of providing text message read acknowledgement to a mobile device sending a text message according to claim 1, wherein:
    said response text message is a short message service (SMS) message.

4. The method of providing text message read acknowledgement to a mobile device sending a text message according to claim 1, wherein:
    said response text message includes enhanced messaging service (EMS) content.

5. The method of providing text message read acknowledgement to a mobile device sending a text message according to claim 1, wherein:
    said response text message includes location content relating to a current location of said recipient mobile phone.

6. The method of providing text message read acknowledgement to a mobile device sending a text message according to claim 1, wherein said initial text message and said response text message both comprise:
    an SMS text message.

7. The method of providing text message read acknowledgement to a mobile device sending a text message according to claim 1, wherein said initial text message and said response text message both comprise:
    an internet protocol (IP) message.

8. The method of providing text message read acknowledgement to a mobile device sending a text message according to claim 1, wherein said mobile phone comprises:
    a GSM device.

9. The method of providing text message read acknowledgement to a mobile device sending a text message according to claim 1, wherein said mobile phone comprises:
    an ESME.

10. The method of providing text message read acknowledgement to a mobile device sending a text message according to claim 1, wherein:
    said initial text message and said response text message both pass through a short message service center (SMSC).

11. The method of providing text message read acknowledgement to a mobile device sending a text message according to claim 1, wherein said read acknowledgement request comprises:
    a set bit in a registered delivery field within said body of said initial text message.

12. The method of providing text message read acknowledgement to a mobile device sending a text message according to claim 1, wherein:
    said read acknowledgement indicator is a set esm_class field within said body of said response text message.

13. The method of providing text message read acknowledgement to a mobile device sending a text message according to claim 12, wherein:
    said esm_class field within said body of said response text message is set to 'xx0101xx'.

14. The method of providing text message read acknowledgement to a mobile device sending a text message according to claim 1, wherein said read acknowledgement request comprises:
    a set bit in a reply option field within said body of said initial text message.

15. The method of providing text message read acknowledgement to a mobile device sending a text message according to claim 1, wherein:
    said read acknowledgement indicator is a set message_type field within said body of said response text message.

* * * * *